Oct. 10, 1967  R. WALLACE  3,346,832
ELECTRICAL CONNECTOR FOR WELDING TORCHES
Filed July 30, 1965

INVENTOR.
RAYMOND WALLACE
BY
Elliott & Pastoriza
ATTORNEYS

United States Patent Office 3,346,832
Patented Oct. 10, 1967

3,346,832
ELECTRICAL CONNECTOR FOR WELDING TORCHES
Raymond Wallace, Hacienda Heights, Calif., assignor to WDL Incorporated, Los Angeles, Calif.
Filed July 30, 1965, Ser. No. 476,018
8 Claims. (Cl. 339—112)

ABSTRACT OF THE DISCLOSURE

This disclosure relates to an electrical connector for connecting a conductor cable to a power source. The connector includes an adapter in the form of a ring which is adapted to be connected to a protruding terminal of a power source, a metal tube having one end connected to the cable and which is fitted through an opening in the adapter member, and flexible tubes surrounding the cable and connected to the metal tube. The tubes are in communication with each other and define flow passages through which a coolant is passed to cool the cable, metal tube, and adapter member.

---

This invention relates generally to electrical connectors and more particularly to power adapters for electric welding torches.

Most electric welding torches in present use have their conductor or power cables connected to the power source by means of threaded couplings and the like which are expensive to manufacture and time consuming to connect.

Since welding torches require electrical power characterized by relatively substantial currents, large amounts of heat are created in the conductive elements and connections, although many welding systems in present use provide cooling means only for the torch itself.

With the foregoing in mind, it is a primary object of the present invention to provide a power adapter for welding torches which eliminates the use of threaded couplings.

Another object is to provide a power adapter for welding torches which includes integral means for cooling the adapter and conductor cables.

Another object is to provide a power adapter which is simple in construction and easy to install.

Briefly, these and many other objects and advantages of this invention are attained in one embodiment by providing a power adapter which preferably consists of a ring-like member having an opening therethrough which is adapted to be mounted upon a protruding terminal coupled to a power source. Positioned within a channel in the ring member is a U-shaped conducting tube to which is attached the power conductor cable. Attached to the ends of the U-shaped tube are flexible tubes through which a coolant can be conducted through the ring and over the cable. Thus, a simple unitary power adapter is provided for electrical connection, which in addition embodies means for not only cooling the adapter itself but cooling the conductor cable as well.

In a second embodiment of the invention, the ring member is preferably a solid body and is provided with a chordal opening therethrough which receives a conductor tube therein. Attached within one end of the conductor tube is a conductor cable. Fitted over each end of the conductor tube is a flexible tube which conducts a coolant over the cable and through a portion of the ring member.

A better understanding of the invention will be had by now referring to preferred embodiments thereof as illustrated in the accompanying drawings, in which.

Figure 1:
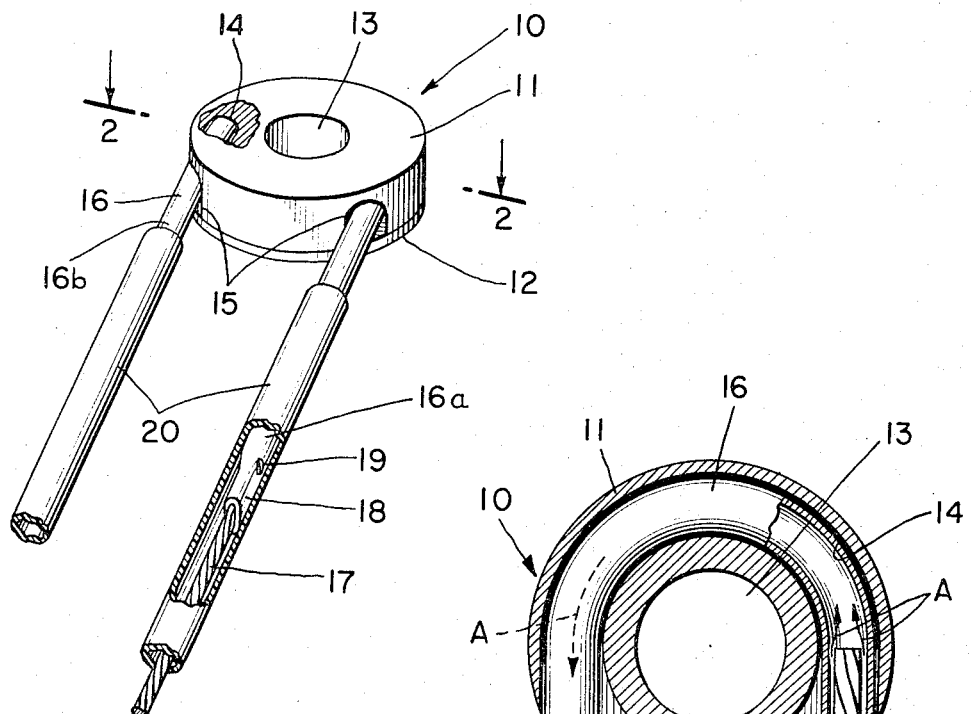
FIGURE 1 is a fragmentary perspective view of one embodiment of the power adapter.

Referring first to FIGURE 1, the power adapter 10 includes a cylindrical conductive ring 11 having a circular plate 12 covering the bottom portion and having a central opening 13 extending therethrough. Defined within the body of the ring 11 is a circular channel 14 to be more fully described with subsequent reference to FIGURE 2. Located on the outer peripheral surface of the ring 11 and communicating with the channel 14, are two spaced tangential openings 15 through which extend the ends of a conductive U-shaped metal tube 16 made, for example, of copper. Disposed within and attached to one end 16a of the U-shaped tube 16 is a conductor cable 17. The cable 17 is preferably attached to the end 16a of the tube 16 by means of a crimped connection 18. Connected to the outer surface of the end 16a of the U-shaped tube 16 is a non-conductive tube 20 formed of flexible plastic material or the like designed for fluid flow therethrough. A similar connection between another plastic tube 20 and an end 16b of the copper tube is made on the outlet side of adapter ring 11.

Figure 2:
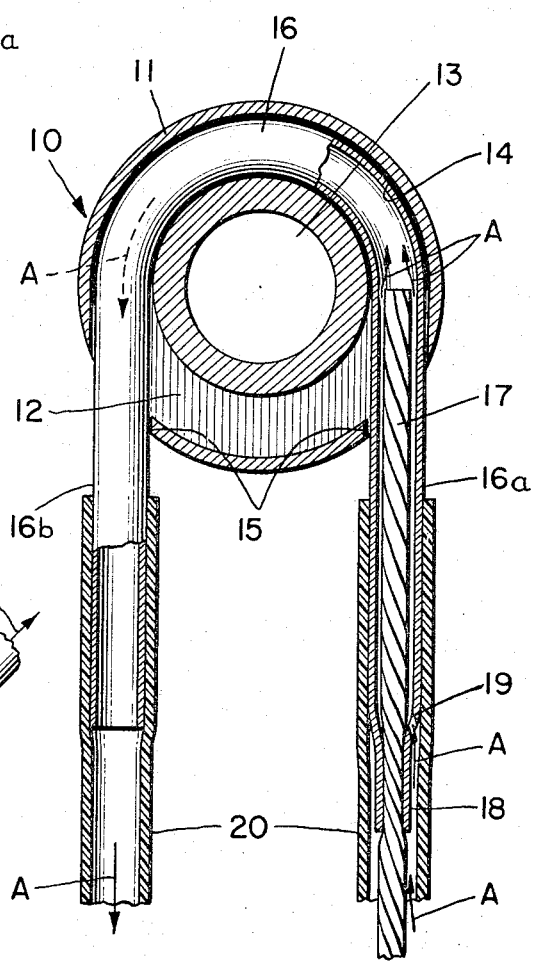
FIGURE 2 is a cross-section taken in the direction of the arrows 2—2 of FIGURE 1; and, FIGURE 3 is a fragmentary perspective view of another embodiment of the power adapter.

Referring now to FIGURE 2, the circular channel 14 is seen clearly formed within the ring 11. The U-shaped tube 16 is positioned within and electrically connected with the ring 11 through the sidewalls of the channel 14.

In order to permit fluid flow into the tube past the cable connection 18, an opening 19 is provided in the increasing diameter portion of the tube 16 as indicated. Thus, a path is created for the coolant to flow through the adapter as indicated by the arrows A which show the flow of coolant going from one of the tubes 20 through the opening 19 into tube 16, thence around the curved portion of the U-shaped tube 16 and thereafter into the other flexible tube 20.

Figure 3:
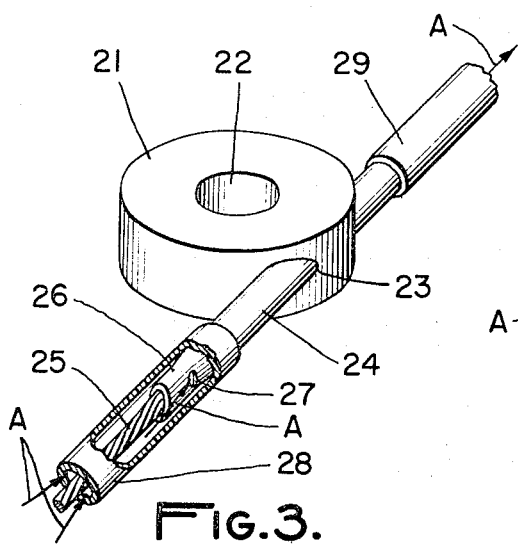

Referring now to the embodiment shown in FIGURE 3, there is illustrated a cylindrical conductive adapter ring 21 having a central opening 22 extending therethrough. Extending along a chord through a portion of the ring 21 is an opening 23 of circular cross-section through which is fitted a conductive metal tube 24.

The tubular and cable connections are similar to those shown in FIGURES 1 and 2 of the embodiment. Thus, positioned within one end of the tube 24 is a conductor cable 25 which is secured thereto by means of a crimped connection 26.

Defined within an inclined portion of the connection 18 is an opening 27.

Attached to an end of the tube 24, around the crimped connection 26, is a flexible tube 28. Attached to the other end of the tube 24 is a second flexible tube 29.

In operation, the adapter shown in FIGURE 2, due to its simple construction, is simply placed about a protruding terminal coupled to a power source with the opening 13 surrounding and contacting the terminal. An electrically conductive path is thus created from the terminal of a power source, through the ring 11, to the U-shaped tube 16, and thence to the conductor cable 17.

A coolant is then caused to flow, as heretofore stated, through one of the flexible tubes 20 through the flow passage 19, and thence through the curved portion of the U-shaped tube 16, and thereafter into the other flexible tube 20.

In the operation of the embodiment of FIGURE 3, the adapter ring 21 is fitted over a protruding terminal coupled to a power source with the opening 22 surrounding and contacting the terminal. An electrically conductive path is thus created from the terminal, through the ring 21, to the tube 24, and thence to the cable 25.

A coolant is then caused to flow in the direction of arrows A, through the flexible tube 28, through the flow passage 27, into the tube 24, and thereafter into the second flexible tube 29.

Thus, in both embodiments the conductor cable and the adapter ring are cooled in conjunction with the cooling of the welding torch or similar means with which the present invention may be utilized.

From the foregoing description, it will be evident that the present invention has provided a new power adapter of simplified construction, which is easily installed.

Various changes falling within the scope and spirit of this invention will occur to those skilled in the art. The power adapter structure is, therefore, not to be thought of as limited to the specific embodiments set forth.

What is claimed is:

1. A power adapter for welding torches, comprising: a cylindrical ring having two tangential openings therein communicating with a channel formed in said ring; a U-shaped tube positioned within said channel and said opening; a conductor cable connected to said tube; and flexible tubes connected to said U-shaped tube, whereby a coolant may flow through said U-shaped tube and about said cable.

2. A power adapter for welding torches, comprising: a conductive ring having a central opening therethrough, said ring further having a circular opening therethrough which extends along a chord positioned through a portion of said ring; a conductive tube fitted within said circular opening; a conductor cable positioned within one end of said tube and secured thereto by means of a crimped connection therewith; a flow passage disposed adjacent said connection; and flexible tubes connected around the ends of said tube, whereby a coolant may flow from one of said flexible tubes through said flow passage in said conductive tube and into the other of said flexible tubes.

3. A power adapter for welding torches, comprising: a cylindrical conductive ring having a central opening therethrough, said ring having a circular channel therein, said ring further having two generally tangential openings therein communicating with said channel; a conductive U-shaped tube positioned within said channel and having ends thereof extending outwardly through said tangential openings; an electrical conductor cable attached within one end of said tube by means of a crimped connection therewith; a flow passage disposed adjacent said connection; and flexible tubes connected around said ends of said U-shaped tube, whereby a liquid coolant may flow from one of said flexible tubes through said flow passage into said U-shaped tube and into the other of said flexible tubes.

4. An electrical connector for connecting a conductor cable to a power source, comprising: an adapter member adapted to be connected to a terminal of the power source, said adapter member having an opening therethrough; a conductor cable; and tubular means surrounding said cable and extending through said opening, said tubular means being connected with said cable and being in engagement with said adapter member to provide an electrically conductive path therebetween, said tubular means defining a flow passage therethrough through which a coolant fluid is adapted to be passed for cooling both said cable and said adapter member.

5. An electrical connector according to claim 4, wherein said tubular means comprises first and second tubular members made from electrically conductive and non-conductive materials, respectively, said first tubular member being connected with said cable at one end and fitted within said opening of said adapter member, and including a side opening, said second tubular member being connected to said first member and defining with the cable a flow passage therethrough which is in communication with said first tubular member by way of said side opening.

6. An electrical connector according to claim 5, wherein said adapter member has a second generally central opening therein which is adapted to receive a terminal of the power source and wherein said opening for receiving said tubular means is a linearly extending opening spaced from said second opening.

7. An electrical connector according to claim 5, wherein said adapter member is ring-shaped and wherein said opening for receiving the tubular means extends chordally of said ring.

8. An electrical connector according to claim 5, wherein said opening for receiving said tubular means is a U-shaped opening; and wherein said first tubular member is U-shaped with its opposite ends projecting outwardly from said adapter member.

References Cited

UNITED STATES PATENTS

| | | | |
|---|---|---|---|
| 1,472,215 | 10/1923 | Goughnour | 339—112 X |
| 2,701,818 | 2/1955 | Tims. | |
| 3,041,408 | 6/1962 | Wreford | 174—15 X |
| 3,082,287 | 3/1963 | Bracken | 174—15 |

MARVIN A. CHAMPION, *Primary Examiner.*

RICHARD E. MOORE, *Examiner.*